United States Patent [19]

Roschmann et al.

[11] Patent Number: 5,305,347
[45] Date of Patent: Apr. 19, 1994

[54] METHOD OF DETECTING THE FREQUENCY DEVIATION IN DIGITAL COMMUNICATION TRANSMISSIONS

[75] Inventors: Hansjörg Roschmann, Neu-Ulm; Walter Theisges, Westerstetten; Manfred Zoberbier, Ulm-Jungingen; Achim Brakemeier, Ulm; Jürgen Lindner, Erbach; Ralf Esprester, Dornstadt, all of Fed. Rep. of Germany

[73] Assignee: Deutsche Aerospace AG, Munich, Fed. Rep. of Germany

[21] Appl. No.: 855,683

[22] Filed: Jul. 7, 1992

[30] Foreign Application Priority Data
Sep. 7, 1990 [DE] Fed. Rep. of Germany ....... 4028369
Aug. 20, 1991 [DE] Fed. Rep. of Germany ....... 4127501

[51] Int. Cl.[5] ...................... H04L 27/30; H04B 17/00
[52] U.S. Cl. .......................... 375/1; 380/34; 380/49; 375/102; 455/67.1; 455/67.3; 455/67.4
[58] Field of Search ................. 375/1, 96, 99, 102, 375/103, 115, 11–16; 455/67.1, 67.3–67.7; 380/34, 49

[56] References Cited

U.S. PATENT DOCUMENTS
3,694,757 9/1972 Hanna, Jr. .................. 375/115 X
5,090,023 2/1992 Watanabe et al. ................. 375/1

FOREIGN PATENT DOCUMENTS
0164108 12/1985 European Pat. Off. ...... H03H 19/00
0387720 9/1990 European Pat. Off. ....... H04B 7/26
2822874 11/1979 Fed. Rep. of Germany ......... H04L 1/24
2161344 1/1986 United Kingdom ........... H04B 7/12

Primary Examiner—Bernarr E. Gregory
Attorney, Agent, or Firm—Spencer, Frank & Schneider

[57] ABSTRACT

The invention discloses a method of measuring the rough frequency deviation in digital communication transmissions with echo propagation, particularly in the short-wave domain. A repeatedly transmitted PN sequence serves as the preamble of a data block. This PN sequence is compressed at the receiving end in matched filters provided in each one of a plurality of simultaneous, frequency offset Doppler channels. The Doppler channel having the greatest amplitude in the quadrature signal is selected for a determination of the rough frequency deviation. To detect a pattern in the preamble, the quadrature signals are examined for similarities by an amplitude comparison or in a cross-correlation process.

9 Claims, 3 Drawing Sheets

METHOD OF DETECTING THE FREQUENCY DEVIATION IN DIGITAL COMMUNICATION TRANSMISSIONS

BACKGROUND OF THE INVENTION

1. Field of the Invention

The invention relates to a method of detecting the frequency position in digital communication transmissions utilizing a preamble of a repeatedly transmitted pseudo random number sequence. Such a known method is disclosed in German Patent Document DE-C2-2,822,874.

2. Description of Related Art

The known method is used, in particular, for high-speed serial telegraphy in the short-wave domain. Heavy linear distortions, phase shifts and frequency offsets of the signals occur on the transmission path. The received signal is usually a mixture of several "echoes". Therefore, all these effects must be detected in the receiver and must be utilized to correct the signal. The known method employs a repeatedly transmitted PN sequence (PN=pseudo noise, that is a pseudo noise sequence) of, preferably, 31 bits in length as a preamble to the individual data blocks. At the receiving end, the preamble is compressed in a quadrature procedure by transverse filters. Preamble and data blocks are processed separately in that filter settings are obtained from an examination of the preamble, and they are employed in the data path to correct the echoes.

FIG. 1 shows the known arrangement for ("quadrature") demodulation of the transmitted carrier-added signal at the receiving end. The arrangement corresponds to that of a coherent receiver. Correction takes place in the base band. Two channels—a sine channel and a cosine channel—are necessary for the "quadrature" demodulation, in which the linearly distorted carrier-added received signal is multiplicatively mixed with a carrier signal made available by a local oscillator, directly in one case and after a carrier phase shift of 90° in the other case. Since thus two channels (the sine channel and the cosine channel) must be processed in the echo correction processor, the pulse response in both channels must also be determined. In order to be able to utilize all of the energy of the useful signal available in a channel, the sine channel and the cosine channel each include a so-called matched filter M. F. which is inverse in time relative to the respective channel and is configured as a transverse filter arrangement. The weights of the transverse filters correspond to the time-inverse pulse response of the two channels. Due to the use of these matched filters, non-linear squaring is avoided (since the method is intended to operate in a linear manner). The transverse filter outputs in the matched filter are combined by adders so that two output signals result which are fed to a reciprocal filter R. F. (quadrature lowpass equalizer). The corrected data are available at the output of the reciprocal filter.

Instead of the double-sideband modulation employed here, it is also possible to employ residual sideband modulation. In this modulation process, the evaluation of the signals in the reciprocal filter can be limited to the output signal of the cosine branch of the matched filter, that is, to the real component of the complex signal.

For this case, the transverse filter arrangement in the matched filter can be simplified accordingly.

The frequency difference (frequency deviation) between the received signal and the receiver may reach up to 60 Hz since the frequency accuracy standard in simple transmitting and receiving devices lies at about $10^{-6}$ and the frequency range extends up to 30 MHz.

With a modulation rate of 3000 Bd, a 31 bit PN sequence lasts $T_{PN}=31/V_T=10.3$ msec, where $T_{PN}$ is the duration of the PN sequence and $V_T$ is the modulation rate (baud rate). With simple correlation techniques, that is, pulse compres-sion with the aid of a transverse filter whose weightings (+ and − ones) are inverse in time with respect to the PN sequence (matched filter in the time domain, sine and cosine channel) it is possible to operate with a frequency dif-ference that corresponds to a 90° shift for the length of the sequence. For 10 msec, this is approximately 25 Hz. If the frequency difference is greater, the so-called ambiguity function results in a considerable reduction of the excess compression at the output of the correlation filter.

OBJECTS AND SUMMARY OF THE PRESENT INVENTION

It is an object of the invention to provide a method of the above-mentioned type which permits detection of the rough frequency deviation in a simple manner.

The solution of this problem according to the present invention is a method of detecting a coarse frequency deviation in digital communication transmissions with echo propagation, par-ticularly in the short-wave domain, in which each data block includes a preamble of a repeatedly transmitted PN sequence which is compressed at the receiving end by trans-verse filters and whose weightings are selected according to the bit values of the time-inverse complete PN sequence, is improved according to the invention in that:

at the receiving end, the preamble is fed to a plurality of simultaneous Doppler channels which are offset in frequency in pairs relative to the received frequency by a positive and a negative amount, respectively;

the preamble is compressed in all Doppler channels; and the rough or coarse frequency deviation is determined by selecting the Doppler channel having the greatest amplitudes in the quadrature signal.

A significant advantage of this solution is that the rough frequency deviation of the transmitted digital signals can be detected very easily and very quickly.

An advantageous modification of the method according to the invention provides that the greatest amplitudes in the quadrature signal are determined only after an average has been formed of the maximum channel burst response duration to be expected.

With this measure, the quota of correctly detected signals in the signal detection process is increased considerably.

Particularly good results in the signal detection are obtained if the frequency offset Δf between the Doppler channels is equal to or at least essentially equal to the inverse of the double PN-sequence duration $T_{PN}$ and preferably is about ±50 Hz.

For a more precise determination of the frequency deviation of the phase shift from PN sequence to PN sequence, the strongest compression signal values in the Doppler channel having the greatest amplitudes are advisably utilized.

To detect a pattern in the compressed preamble, the quadrature signals are advantageously examined for similarity from PN interval to PN interval.

The examination for similarity may here be effected, for example, by a cross-correlation between a PN interval and the preceding intermediately stored PN interval or by amplitude comparisons between successive PN intervals. In the latter case, averages are advisably formed over several signal amplitudes, in each case at the spacing of the PN intervals, and the average similarity of these averages is evaluated.

DETAILED DESCRIPTION OF THE PREFERRED EMBODIMENT

The invention will now be described in greater detail with reference to FIGS. 2 and 3.

The presently available computing power of digital signal processors (DSP) attains 10 million instructions/operations per second in a single-chip processor. Employing the method according to the invention, this processing rate is sufficient to perform real time processing in several frequency offset simultaneous Doppler channels. These simultaneous Doppler channels preferably maintain a frequency spacing $\Delta f$ of that double value which corresponds to the 90° shift ($\Delta f = \frac{1}{2} T_{PN}$). Thus, for 3000 Bd this comes to two times 25 Hz, that is, 50 Hz. If, for example, a total of three such Doppler channels are employed, an unequivocal signal detection and measuring range of theoretically as much as plus/minus $3 \times 25$ Hz, that is, 75 Hz is realized. In each one of the Doppler channels, the received signals are correlated and this is done simultaneously, that is, a total of six matched filters are produced for each PN sequence. The two output signals from the correlators of each Doppler channel are subsequently squared and added (quadrature signal).

Figure 1:
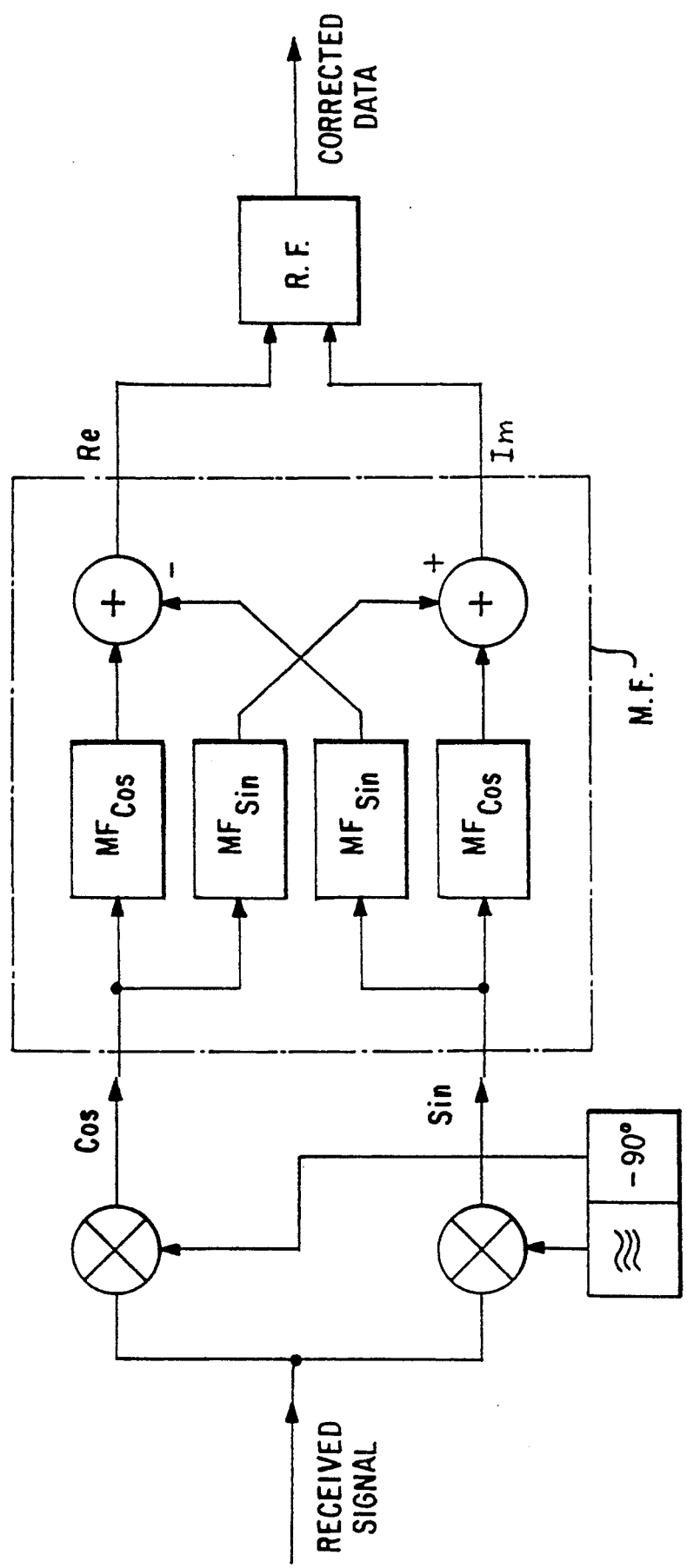
FIG. 1 shows a conventional arrangement for a quadrature demodulator of a receiver.
Figure 2:
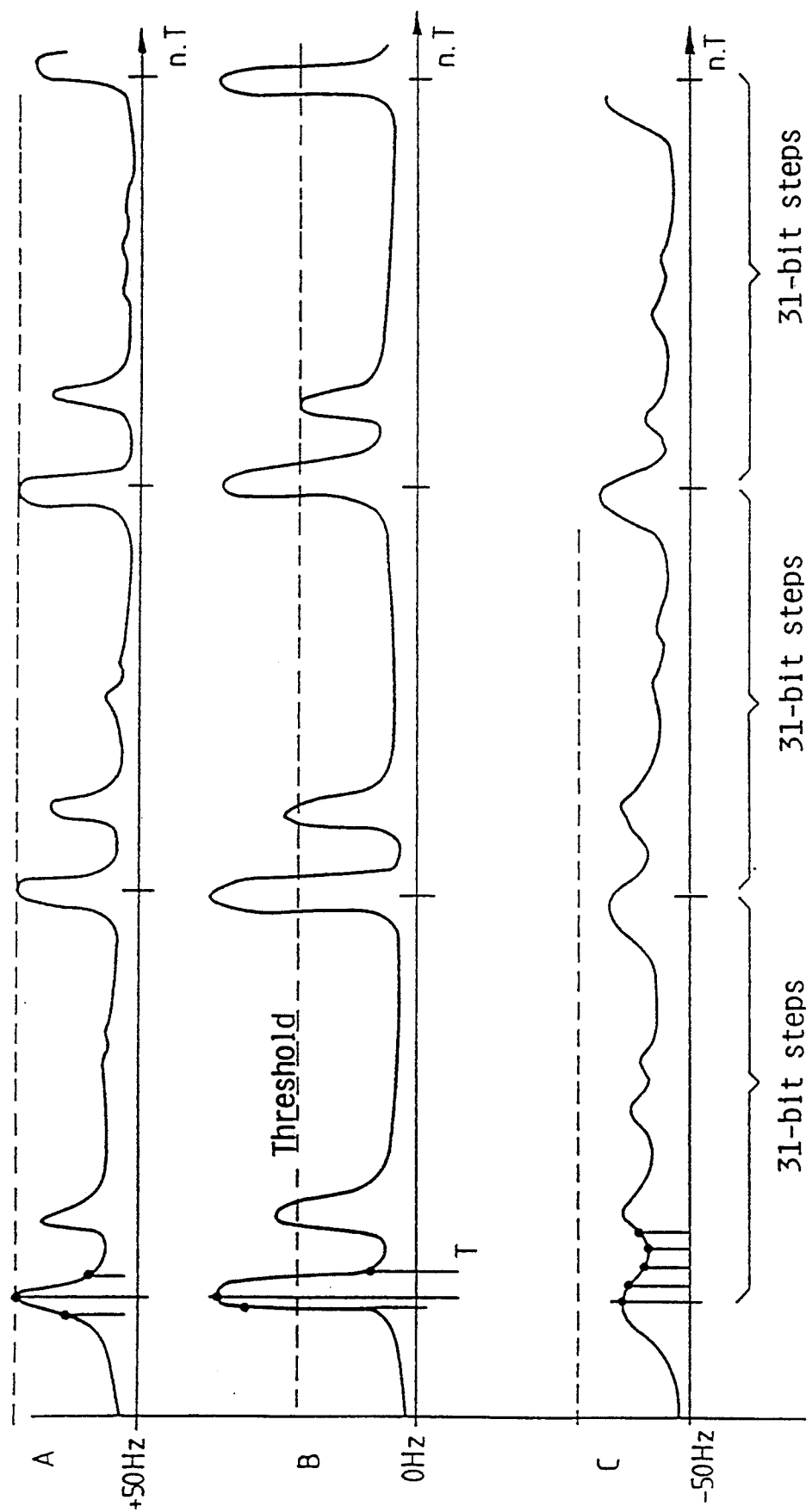
FIG. 2 is a schematic representation of an example of three Doppler channels of a pulse response of a 31-bit PN sequence according the present invention.

FIG. 2 is a schematic representation for the example of three Doppler channels of the pulse responses of a 31-bit PN sequence in the three Doppler channels with an assumed frequency deviation of +10 Hz relative to the receiver. Channel B is the original channel (no frequency offset); channel A, however, is frequency offset by +50 Hz, channel C by −50 Hz. It is assumed that propagation takes place on two paths with different amplitudes. The letter T identifies one bit length. The rough, or coarse, frequency deviation of the received signal relative to the receiver is determined by the digital signal processor in that it selects the Doppler channel having the greatest amplitude in the quadrature signal; in FIG. 2 that is channel B. The threshold must be determined empirically.

From this channel, the strongest signal values are then utilized to determine the precise, or fine, frequency deviation from the phase shift from PN sequence to PN sequence. Details regarding this can be found, for example, in DE-C2-2,822,874.

The ±50 Hz detuned Doppler channels are produced in the lowpass channel (sine and cosine channel) employing the Manske method (R. A. Manske, "Computer Simulation of Narrowband Systems", in IEEE Trans. Comp. Vol. C-17, No. 4, April, 1968, pages 301-308).

Figure 3:
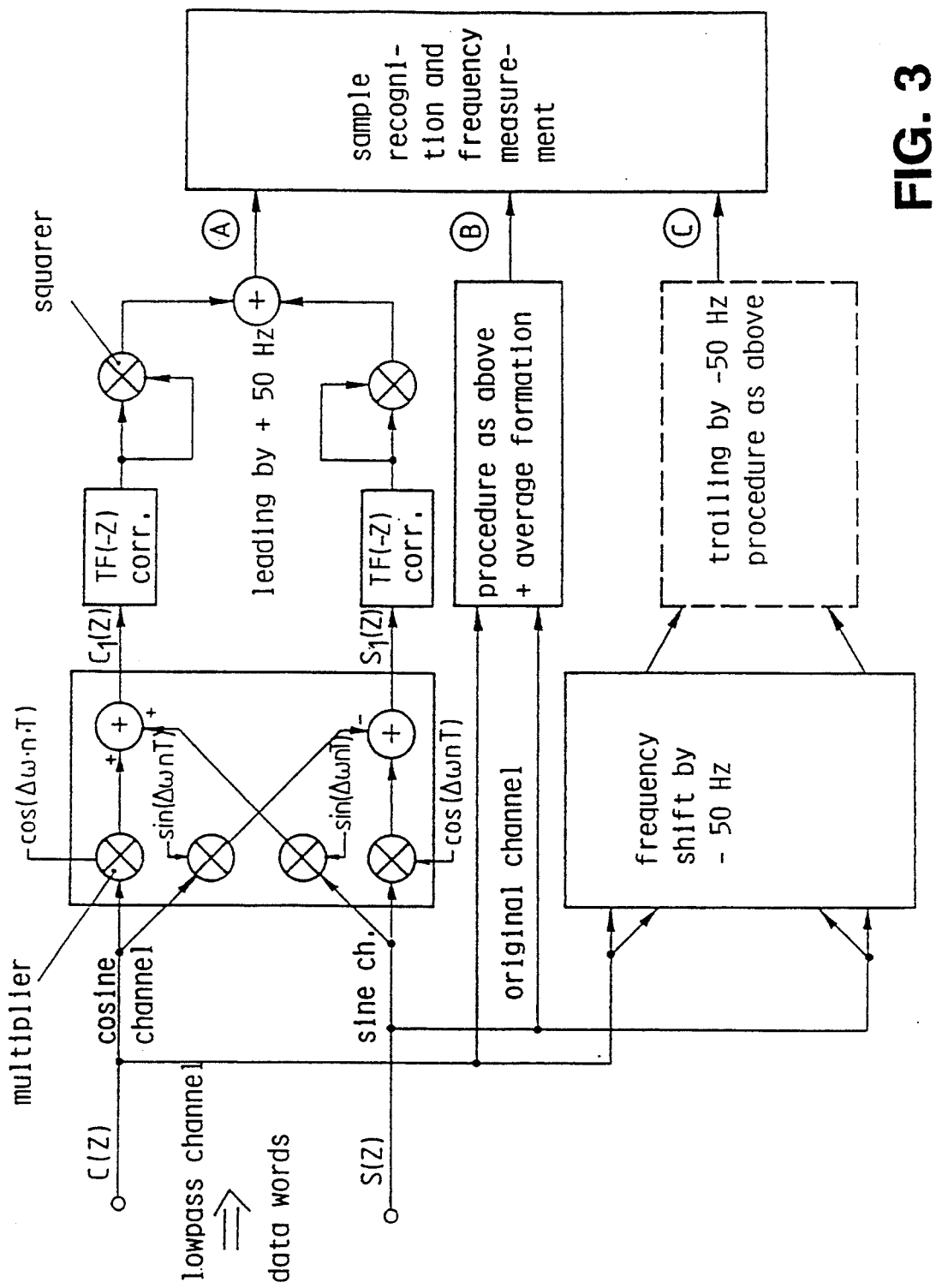
FIG. 3 is a circuit block diagram of three Doppler channels according to the present invention.

FIG. 3 is a block circuit diagram for three such Doppler channels. Only channel A is shown in detail. The shifting procedure according to Manske resides in a cross-wise linkage of sine and cosine channel by way of four multiplication and two addition operations. In channel B this part is omitted, in channel C the arrangement cor-responds to that of A, with a negative $\Delta \omega$. All three channels each include two matched filters TF ($-z$).

The output signals of the two matched filters of a Doppler channel must be combined according to the quadrature method (squaring, adding) and must be analyzed with the aid of a pattern recognition process. Characteristic for this process is the fact that, corresponding to the periodically repeated PN sequences, the quadrature output signals of the three Doppler channels must also repeat after every 31-bit step interval. Only noise signals (e.g. channel noise) and ionospheric instability are superposed on this periodic process and falsify it.

An advantageous pattern recognition process according to the invention is directed toward detecting a similarity of the signal intervals that are repeated every 31 steps. Another important characteristic of the quadrature output signals is their excessive amplitude compared to the received signal before correlation (matched filtering).

The reliability of the signal detection is greater the more PN sequence repetitions occur in the preamble. The similarity of the quadrature signal can be determined according to the invention by amplitude comparison of the successive 31-bit intervals as well as by cross-correlation processes. In order to consider the noise influences to be expected in practice, a small deviation is permissible between the preceding PN interval and the next 31-bit interval.

The cross-correlation is performed between one PN interval and the preceding, intermediately stored PN inter-val.

For the amplitude comparison it is of advantage to also form averages over several signal amplitudes (for example, over 5 for a preamble including 10 PN sequences), each spaced at 31 bits, and the average similarity of these signal amplitudes can be evaluated, with stronger signal values being given a preference weighting.

We claim:

1. A method of detecting a coarse frequency deviation of a digital communication transmission having echo propagation, wherein the transmission includes a plurality of data blocks where each data block includes a preamble of a repeated pseudo noise sequence comprising the steps of:

applying the preamble of a data block to a plurality of simultaneous Doppler channels at a receiver, the plurality of simultaneous Doppler channels including at least one pair of simultaneous Doppler channels offset in frequency relative to a received frequency of the transmission by a predetermined positive and predetermined negative amount, respectively;

compressing the preamble in each simultaneous Doppler channel to produce a quadrature signal associated with each simultaneous Doppler channel; and determining the coarse frequency deviation of the transmission based on an amplitude of a quadrature signal associated with a Doppler channel.

2. A method according to claim 1, wherein the plurality of simultaneous Doppler channels includes three simultaneous Doppler channels with two simultaneous Doppler channels being shifted in frequency by a predetermined positive and a predetermined negative amount, respectively, relative to a received frequency of the transmission.

3. A method according to one of claim 1, wherein the step of determining the coarse frequency deviation includes averaging amplitudes of quadrature signals over a predetermined time interval corresponding to a maximum channel burst response duration associated with the transmission.

4. A method according to claim 1, wherein the frequency offset between the at least one pair of simultaneous Doppler channels relative to the received frequency of the transmission is substantially equal to an inverse of a double pseudo noise sequence duration $T_{PN}$.

5. A method according to claim 1, further comprising the step of determining a fine frequency deviation of the transmission based on a phase shift from pseudo noise sequence to pseudo noise sequence of the quadrature signal having a greatest amplitude.

6. A method according to claim 1, further comprising the step of detecting patterns of the preamble based on a similarity between pseudo noise sequences in a quadrature signal.

7. A method according to claim 6, wherein the similarity is related to a cross-correlation on pseudo noise sequences.

8. A method according to claim 6, wherein the similarity is related to an amplitude comparison between successive pseudo noise sequences.

9. A method according to claim 8, the amplitude comparison is based on a similarity of a plurality of averages formed over a plurality of signal amplitudes related to a length of the pseudo noise sequence.

* * * * *

UNITED STATES PATENT AND TRADEMARK OFFICE
CERTIFICATE OF CORRECTION

PATENT NO. : 5,305,347

DATED : April 19, 1994

INVENTOR(S) : Hansjöerg ROSCHMANN et al

It is certified that error appears in the above-identified patent and that said Letters Patent is hereby corrected as shown below:

On the title page:

ITEM 30 Foreign Application Data
- insert

Sept 3, 1991 (WO) WIPO  PCT/EP91/01661

Signed and Sealed this

Eighteenth Day of October, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,305,347
DATED : April 19, 1994
INVENTOR(S) : Hansjöerg ROSCHMANN et al.

It is certified that error appears in the above-indentified patent and that said Letters Patent is hereby corrected as shown below:

On the cover sheet, left hand column after "[22]" delete "Filed: July 7, 1992, and insert:

--     PCT Filed:     Sept. 3, 1991

[86]    PCT No.:     PCT/EP91/01661
       § 371 Date:     July 7, 1992
       § 102(e) Date:     July 7, 1992

[87]    PCT Pub. No.:     WO 92/04783
       PCT Pub. Date:     March 19, 1992--

This certificate supersedes Certificate of Correction issued October 18, 1994.

Signed and Sealed this

Seventh Day of February, 1995

Attest:

BRUCE LEHMAN

Attesting Officer      Commissioner of Patents and Trademarks